United States Patent
Nose et al.

(10) Patent No.: US 11,454,204 B2
(45) Date of Patent: Sep. 27, 2022

(54) IGNITION TIMING CONTROLLER AND IGNITION TIMING CONTROL METHOD FOR MULTI-CYLINDER INTERNAL COMBUSTION ENGINE

(71) Applicant: TOYOTA JIDOSHA KABUSHIKI KAISHA, Toyota (JP)

(72) Inventors: Yuki Nose, Nagoya (JP); Yuto Ikeda, Okazaki (JP); Takanobu Gotoh, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/491,718

(22) Filed: Oct. 1, 2021

(65) Prior Publication Data
US 2022/0145843 A1 May 12, 2022

(30) Foreign Application Priority Data
Nov. 6, 2020 (JP) ............................. JP2020-185766

(51) Int. Cl.
*F02P 5/152* (2006.01)
*F02B 75/18* (2006.01)
(Continued)

(52) U.S. Cl.
CPC .............. *F02P 5/152* (2013.01); *F02B 75/18* (2013.01); *F02D 13/06* (2013.01); *F02D 35/027* (2013.01);
(Continued)

(58) Field of Classification Search
CPC ........ F02P 5/152; F02P 5/1521; F02P 5/1523; F02B 75/18; F02D 13/06; F02D 35/027;
(Continued)

(56) References Cited

U.S. PATENT DOCUMENTS 4,694,801 A * 9/1987 Nagai .................... F02P 5/152
123/406.33
4,819,171 A * 4/1989 Morita .................. F02P 5/1521
123/406.36
(Continued)

FOREIGN PATENT DOCUMENTS

JP 2001-182601 A 7/2001
JP 2008223768 A * 9/2008

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A multi-cylinder internal combustion engine is configured to perform an all-cylinder operation and a partial-cylinder operation. The ignition timing controller executes a process that sets a knock control amount and a knock learning value, a process that determines whether knocking is occurring, a process that updates a value of the knock control amount in accordance with whether knocking is occurring, a process that updates the knock learning value such that the knock learning value gradually approaches a knock control operated amount, a process that operates ignition timing of each cylinder based on the knock control amount and the knock learning value, and a process that limits update of the knock learning value such that a followability of the knock learning value to the knock control operated amount is lower during the partial-cylinder operation than during the all-cylinder operation.

6 Claims, 4 Drawing Sheets

(51) Int. Cl.
*F02D 41/24* (2006.01)
*F02D 41/02* (2006.01)
*F02D 41/00* (2006.01)
*F02D 35/02* (2006.01)
*G01L 23/22* (2006.01)
*F02D 13/06* (2006.01)

(52) U.S. Cl.
CPC ....... *F02D 41/008* (2013.01); *F02D 41/0087* (2013.01); *F02D 41/024* (2013.01); *F02D 41/2429* (2013.01); *F02P 5/1521* (2013.01); *F02P 5/1523* (2013.01); *G01L 23/221* (2013.01); *F02D 2200/0802* (2013.01)

(58) Field of Classification Search
CPC .. F02D 41/008; F02D 41/0087; F02D 41/024; F02D 41/2429; F02D 2200/0802; F02D 2200/0812; F02D 2250/24; F02D 41/029; G01L 23/221
USPC .......................................... 123/406.21, 406.19
See application file for complete search history.

(56) References Cited

U.S. PATENT DOCUMENTS

| | | | | |
|---|---|---|---|---|
| 5,035,219 A | * | 7/1991 | Oh | F02P 5/1527 123/406.33 |
| 5,542,389 A | * | 8/1996 | Miyamoto | F02P 5/1504 123/339.1 |
| 6,763,297 B1 | * | 7/2004 | Stahl | F02D 35/027 701/111 |
| 10,267,256 B1 | * | 4/2019 | Dudar | |
| 2001/0002538 A1 | * | 6/2001 | Katsuta | F01N 3/0835 60/287 |
| 2003/0102175 A1 | * | 6/2003 | Wakashiro | F02D 41/221 903/918 |
| 2004/0035113 A1 | * | 2/2004 | Hanada | F02D 41/0087 903/917 |
| 2004/0098970 A1 | * | 5/2004 | Foster | F02D 41/0255 60/284 |
| 2004/0158388 A1 | * | 8/2004 | Fujiwara | F02P 5/1527 123/406.35 |
| 2004/0163623 A1 | * | 8/2004 | Fukusako | F02D 13/06 123/406.33 |
| 2004/0216449 A1 | * | 11/2004 | Szymkowicz | F02D 41/0087 60/284 |
| 2004/0226539 A1 | * | 11/2004 | Takahashi | F02D 35/027 123/406.33 |
| 2009/0043484 A1 | * | 2/2009 | Yoshihara | G01L 23/225 701/111 |
| 2009/0150059 A1 | * | 6/2009 | Santoso | F02D 41/064 701/113 |
| 2011/0307158 A1 | * | 12/2011 | Imamura | F02P 11/00 701/102 |
| 2014/0216368 A1 | * | 8/2014 | Sasaki | F02D 17/02 123/41.01 |
| 2014/0350823 A1 | * | 11/2014 | Glugla | F02D 41/0087 701/104 |
| 2015/0211472 A1 | * | 7/2015 | Carlson | F02D 17/02 123/406.21 |
| 2017/0159581 A1 | * | 6/2017 | McCarthy, Jr. | F02B 3/06 |
| 2017/0356367 A1 | * | 12/2017 | Glugla | F02D 41/0087 |

* cited by examiner

IGNITION TIMING CONTROLLER AND IGNITION TIMING CONTROL METHOD FOR MULTI-CYLINDER INTERNAL COMBUSTION ENGINE

BACKGROUND

1. Field

The present disclosure relates to an ignition timing controller and an ignition timing control method for a multi-cylinder internal combustion engine that performs a partial-cylinder operation.

2. Description of Related Art

As disclosed in Japanese Laid-Open Patent Publication No. 2001-182601, a type of multi-cylinder internal combustion engine has been known that performs an all-cylinder operation, which performs combustion in all the cylinders, and a partial-cylinder operation, which suspends combustion in some cylinders while performing combustion in the remaining cylinders.

Many internal combustion engines such as vehicle on-board engines include a knock sensor, for example, in a cylinder block to detect vibration caused by knocking, and perform a knock control based on the detected result. The knock control advances the ignition timing within a range in which knocking is suppressed. The knock control learns, as a knock learning value, the operated amount for advancing the ignition timing, thereby improving the responsiveness of the knock control.

On the other hand, the cylinders in which combustion is suspended during the partial-cylinder operation generate vibration that is different from the vibration generated during combustion. The knock sensor may detect such vibration of the combustion-suspended cylinders and thus make an erroneous knock determination. A result of the knock control based on an erroneous knock determination during the partial-cylinder operation may be reflected on the knock learning value. This may reduce the learning accuracy of the knock learning value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an ignition timing controller for a multi-cylinder internal combustion engine is provided. The multi-cylinder internal combustion engine is configured to perform an all-cylinder operation that performs combustion in all cylinders, and a partial-cylinder operation that suspends combustion in part of the cylinders while performing combustion in the remaining cylinders. The ignition timing controller includes processing circuitry. The processing circuitry is configured to execute: a process that sets a knock control amount and a knock learning value as operated amounts of ignition timing for advancing the ignition timing within a range in which knocking is suppressed; a knock determination process that determines whether knocking is occurring based on an output signal of a knock sensor; and a feedback correction process. The feedback correction process updates the knock control amount so as to reduce the operated amounts for advancing the ignition timing when it is determined that knocking is occurring, and updates the knock control amount so as to increase the operated amounts for advancing the ignition timing when it is determined that knocking is not occurring. The circuitry also executes a learning process and an operation process. The learning process updates the knock learning value such that the knock learning value gradually approaches a knock control operated amount. The knock control operated amount is an operated amount for advancing the ignition timing based on the knock control amount and the knock learning value. The operation process operates ignition timing of each cylinder based on the knock control amount and the knock learning value. The circuitry further executes a process that limits update of the knock learning value such that a followability of the knock learning value to the knock control operated amount is lower during the partial-cylinder operation than during the all-cylinder operation.

In another general aspect, an ignition timing control method for a multi-cylinder internal combustion engine is provided. The multi-cylinder internal combustion engine is configured to perform: an all-cylinder operation that performs combustion in all cylinders; and a partial-cylinder operation that suspends combustion in part of the cylinders while performing combustion in the remaining cylinders. The ignition timing control method comprises: setting a knock control amount and a knock learning value as operated amounts of ignition timing for advancing the ignition timing within a range in which knocking is suppressed; determining whether knocking is occurring based on an output signal of a knock sensor; updating the knock control amount so as to reduce the operated amounts for advancing the ignition timing when it is determined that knocking is occurring; updating the knock control amount so as to increase the operated amounts for advancing the ignition timing when it is determined that knocking is not occurring; updating the knock learning value such that the knock learning value gradually approaches a knock control operated amount, the knock control operated amount being an operated amount for advancing the ignition timing based on the knock control amount and the knock learning value; operating ignition timing of each cylinder based on the knock control amount and the knock learning value; and limiting update of the knock learning value such that a followability of the knock learning value to the knock control operated amount is lower during the partial-cylinder operation than during the all-cylinder operation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Figure 1:
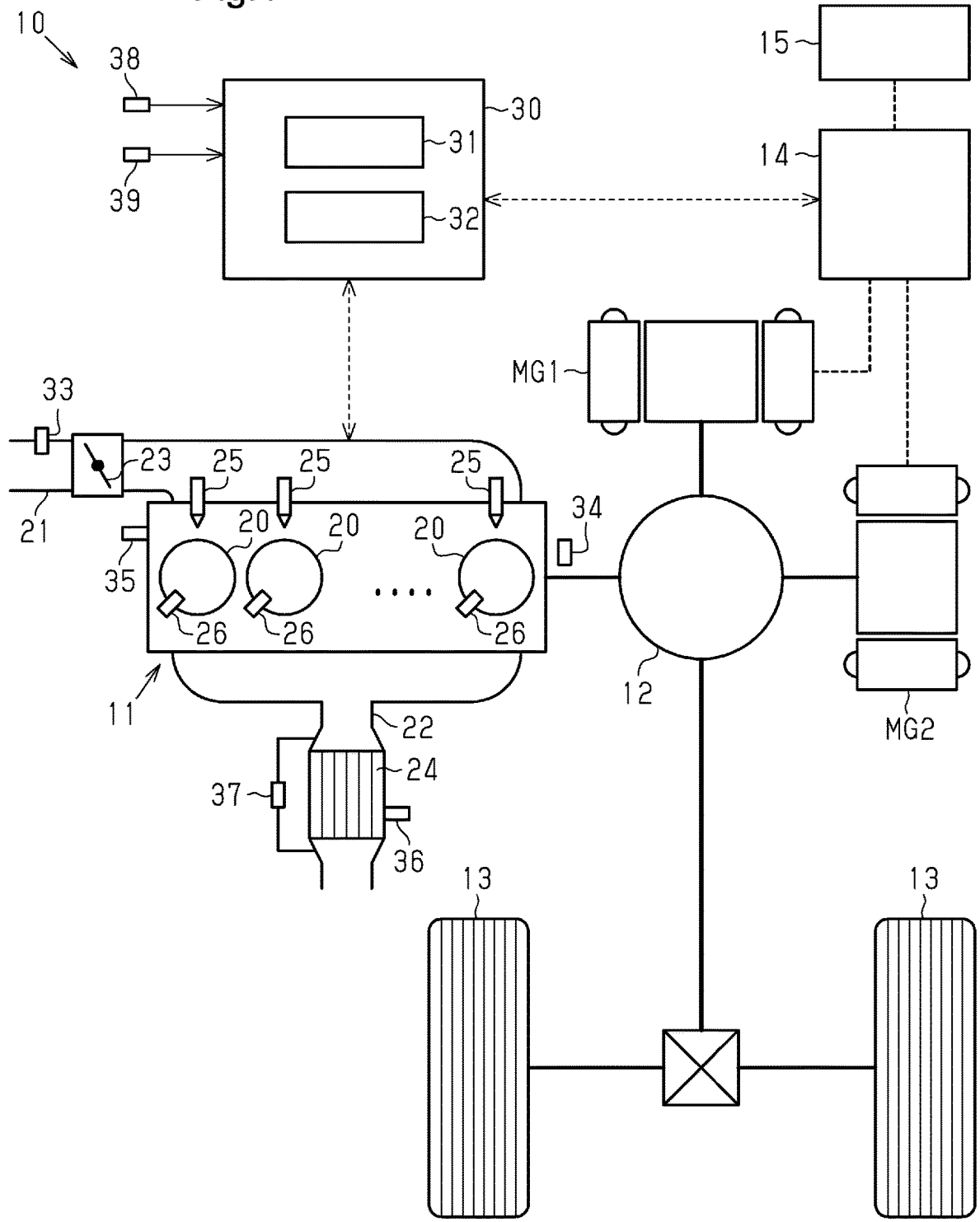
FIG. 1 is a schematic diagram showing an ignition timing controller for a multi-cylinder internal combustion engine according to a first embodiment.

An ignition timing controller for a multi-cylinder internal combustion engine 11 according to a first embodiment will now be described with reference to FIGS. 1 to 3.

Configuration of Embodiment

First, the configuration of the ignition timing controller according to the present embodiment will be described with reference to FIG. 1. The ignition timing controller according to the present embodiment is mounted on a hybrid vehicle 10. The hybrid vehicle 10 includes the multi-cylinder internal combustion engine 11 and two generator motors MG1, MG2 as drive sources. The multi-cylinder internal combustion engine 11 and two generator motors MG1, MG2 are mechanically connected to driven wheels 13 via a power splitting mechanism 12. The two generator motors MG1, MG2 are electrically connected to a battery 15 via an inverter 14. The inverter 14 regulates the amount of electricity transferred between the generator motors MG1, MG2 and the battery 15. The generator motors MG1, MG2 function as electric motors, which receive electricity from the battery 15 to generate power. The generator motors MG1, MG2 also function as generators, which receive force from the outside to generate electricity. In the present embodiment, the generator motors MG1, MG2 correspond to electric motors.

The multi-cylinder internal combustion engine 11 includes cylinders 20, an intake passage 21, which is an introduction passage for intake air to the cylinders 20, and an exhaust passage 22, which is a discharge passage for exhaust gas from the cylinders 20. The intake passage 21 incorporates a throttle valve 23. The exhaust passage 22 incorporates a catalyst device 24 for purifying exhaust gas. The catalyst device 24 is configured to purify exhaust gas by oxidizing and reducing hazardous constituents in the exhaust gas, and to function as a filter that traps fine particulate matter in the exhaust gas. The multi-cylinder internal combustion engine 11 further includes injectors 25 for the respective cylinders 20. The injectors 25 spray fuel into intake air drawn into the cylinders 20. Each cylinder 20 is provided with an ignition device 26, which ignites air-fuel mixture drawn into the cylinder 20 by spark discharge.

The hybrid vehicle 10 includes an electronic control unit 30. The electronic control unit 30 includes an arithmetic processing circuit 31 and a memory 32. The memory 32 stores programs and data used to control the hybrid vehicle 10 in advance. The electronic control unit 30 receives output signals of various sensors configured to detect an operating state of the hybrid vehicle 10, such as an air flow meter 33, a crank angle sensor 34, a knock sensor 35, a catalyst temperature sensor 36, a differential pressure sensor 37, an accelerator operation amount sensor 38, and a vehicle speed sensor 39. The air flow meter 33 is a sensor that detects an intake air amount GA, which is the flow rate of intake air flowing through the intake passage 21 of the multi-cylinder internal combustion engine 11. The crank angle sensor 34 is a sensor that detects a crank angle. The crank angle is a rotation angle of a crankshaft, which is the output shaft of the multi-cylinder internal combustion engine 11. The electronic control unit 30 obtains an engine rotation speed NE from the output signal of the crank angle sensor 34. The engine rotation speed NE is the number of revolutions per unit time of the crankshaft. The knock sensor 35 is configured to detect vibration that accompanies knocking of the multi-cylinder internal combustion engine 11, and is attached to the cylinder block of the multi-cylinder internal combustion engine 11. The catalyst temperature sensor 36 is configured to detect a catalyst temperature TC, which is the temperature of a catalyst support provided inside the catalyst device 24. The differential pressure sensor 37 is configured to detect a differential pressure between the upstream side and the downstream side of the catalyst device 24, or the difference between the pressure of the exhaust gas flowing into the catalyst device 24 and the pressure of the exhaust gas flowing out from the catalyst device 24. The accelerator operation amount sensor 38 detects an accelerator operation amount, which is, for example, the depression amount of the accelerator pedal by the driver. The vehicle speed sensor 39 detects a vehicle speed, which is a traveling speed of the hybrid vehicle 10.

The electronic control unit 30 performs various types of control for the hybrid vehicle 10 by using the arithmetic processing circuit 31, which loads and executes programs in the memory 32 based on the output signals from the sensors. For example, the electronic control unit 30 controls the operating state of the multi-cylinder internal combustion engine 11 by regulating the opening degree of the throttle valve 23, the fuel injection amount of the injectors 25, and the ignition timing of the ignition devices 26. Also, the electronic control unit 30 regulates the amount of electricity transferred between the generator motors MG1, MG2 and the battery 15 by operating the inverter 14, so as to control the driving/regenerative torque of the generator motors MG1, MG2.

<Filter Regeneration Control>

As described above, the catalyst device 24 of the multi-cylinder internal combustion engine 11 functions as a filter that traps fine particulate matter in exhaust gas. The trapped fine particulate matter is gradually accumulated in the catalyst device 24, which may eventually clog the catalyst device 24. The electronic control unit 30 performs filter regeneration control to remove fine particulate matter accumulated in the catalyst device 24 before clogging occurs.

During operation of the multi-cylinder internal combustion engine 11, the electronic control unit 30 calculates a PM accumulated amount DPM, which is the amount of fine particulate matter accumulated in the catalyst device 24, based on the output signal of the differential pressure sensor 37. The electronic control unit 30 performs the filter regeneration control to burn and remove the fine particulate matter accumulated in the catalyst device 24 on condition that the PM accumulated amount DPM has exceeded a specified clogging determination value D1 and that the catalyst temperature TC is lower than a specified heating start temperature T0. The clogging determination value D1 is set to a value obtained by subtracting an allowance from the PM accumulated amount DPM of a state in which the catalyst device 24 is clogged.

Figure 2:
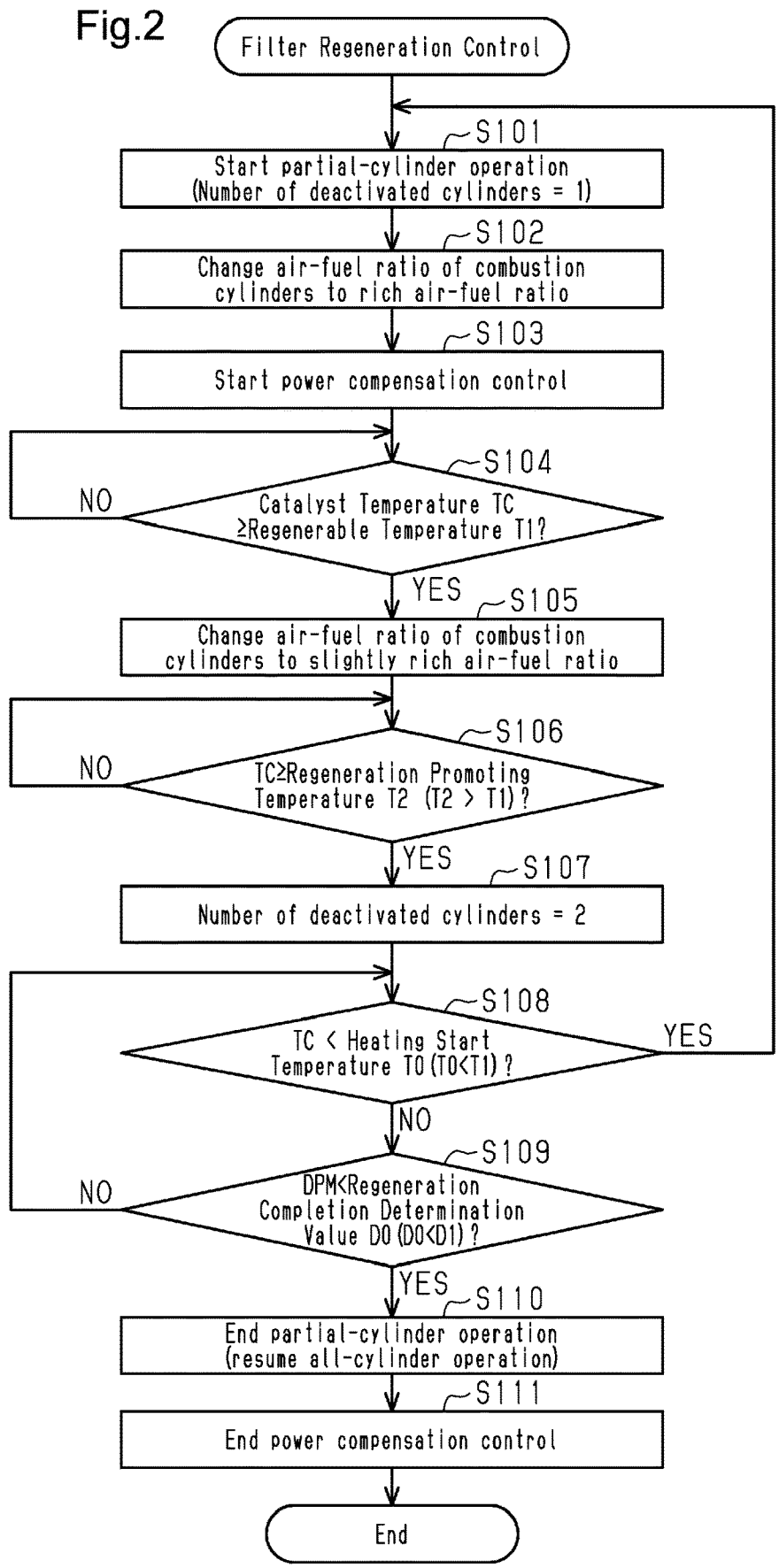
FIG. 2 is a flowchart of a filter regeneration control performed in a hybrid vehicle in which the ignition timing controller shown in FIG. 1 is used.

FIG. 2 shows a procedure of processes of the filter regeneration control performed by the electronic control unit 30. The electronic control unit 30 starts the series of processes shown in FIG. 2 in response to satisfaction of execution conditions for the filter regeneration control.

When the filter regeneration control is started, the electronic control unit 30 first starts a partial-cylinder operation in step S101 to suspend combustion in some of the cylinders 20, while performing combustion in the remaining cylinders 20. In the following description, the cylinders 20 in which combustion is suspended by the partial-cylinder operation will be referred to as deactivated cylinders, and the cylinders in which combustion is performed will be referred to as combustion cylinders. During the partial-cylinder operation, fuel injection to the deactivated cylinders and ignition in the deactivated cylinders are suspended. At this point, the number of the deactivated cylinders is one. When the execution conditions for the filter regeneration control are not satisfied in the multi-cylinder internal combustion engine 11, an all-cylinder operation is performed, in which combustion is performed basically in all the cylinders 20. Next, the electronic control unit 30 increases the fuel injection amount to the combustion cylinders, so as to cause the air-fuel ratio of the air-fuel mixture burned in the combustion cylinders to be richer than the stoichiometric air-fuel ratio (S102). In the following description, the air-fuel ratio in the combustion cylinders in this case will be referred to as a rich air-fuel ratio.

Further, the electronic control unit 30 starts a power compensation control at the same time as the starting of the partial-cylinder operation. During the partial-cylinder operation, the power compensation control compensates for the reduction in the driving force due to the deactivated cylinder by the output of the generator motors MG1, MG2. In the power compensation control, the electronic control unit 30 first calculates, as a value of torque deficiency, the amount of reduction in the output torque of the multi-cylinder internal combustion engine 11 due to the suspension of combustion in the deactivated cylinder. The electronic control unit 30 then increases the torque of the generator motor MG2 by an amount corresponding to the torque deficiency during the period in which the deactivated cylinder is in the expansion stroke. Also, in the power compensation control, the electronic control unit 30 calculates, as a value of excess torque, the amount of increase of the output torque achieved by richening the air-fuel ratio in the combustion cylinders during the partial-cylinder operation. During the period of the expansion stroke of the combustion cylinders, the electronic control unit 30 increases the amount of electricity generated by the generator motors MG1 in order to cancel out the excess torque.

During the partial-cylinder operation, the reduction in torque in response to the suspended combustion in the deactivated cylinder and the increase in combustion torque due to richened air-fuel ratio in the combustion cylinders increase the fluctuation of the output torque of the multi-cylinder internal combustion engine 11. If such increase in the fluctuation of the output torque of the multi-cylinder internal combustion engine 11 caused by the partial-cylinder operation is reflected on the fluctuation of the driving force, the drivability of the hybrid vehicle 10 would be reduced significantly. In this regard, the electronic control unit 30 of the present embodiment performs the power compensation control in order to compensate for the reduction in torque due to suspended combustion using the generator motors MG2, and to cancel out the increase in combustion torque of the combustion cylinders due to the richened air-fuel ratio by using the torque increase to generate electricity in the generator motor MG1. This suppresses deterioration of the drivability of the hybrid vehicle 10 during the partial-cylinder operation.

When the partial-cylinder operation is started, exhaust gas containing unburned fuel is discharged from the combustion cylinders to the exhaust passage 22, and fresh air is discharged from the deactivated cylinder to the exhaust passage 22. In the catalyst device 24, the unburned fuel discharged from the combustion cylinders is oxidized with the oxygen in the fresh air discharged from the deactivated cylinder, and the heat generated by the oxidation increases the catalyst temperature TC. Thereafter, when the catalyst temperature TC is greater than or equal to a specified regenerable temperature T1 (S104: YES), the electronic control unit 30 changes the air-fuel ratio of the combustion cylinders to a slightly rich air-fuel ratio, which is richer than the stoichiometric air-fuel ratio and leaner than the above-described rich air-fuel ratio (S105). The regenerable temperature T1 is set to the catalyst temperature TC at the time when the fine particulate matter accumulated in the catalyst device 24 reaches the combustion temperature. When the catalyst temperature TC is greater than or equal to the regenerable temperature T1, the accumulated fine particulate matter starts being oxidized in the catalyst device 24 in addition to the unburned fuel. Thus, if the air-fuel ratio of the combustion cylinders is maintained to be rich even after the catalyst temperature TC exceeds the regenerable temperature T1, the catalyst temperature TC may increase excessively. In this regard, the electronic control unit 30 of the present embodiment changes the air-fuel ratio of the combustion cylinders to the slightly rich air-fuel ratio when the catalyst temperature TC becomes greater than or equal to the regenerable temperature T1. This reduces the amount of unburned fuel flowing into the catalyst device 24 and thus prevents the catalyst temperature TC from being increased excessively.

Further, when the catalyst temperature TC becomes greater than or equal to a regeneration promoting temperature T2, which is higher than the regenerable temperature T1 (S106: YES), the electronic control unit 30 increases the number of deactivated cylinders in the partial-cylinder operation from one to two. The increase in the number of deactivated cylinders increases the amount of oxygen supplied to the catalyst device 24. This promotes oxidation of unburned fuel that has not been burned and remains in the catalyst device 24. The heat generated by the oxidation promotes combustion and removal of the fine particulate matter in the catalyst device 24.

The increase in the number of deactivated cylinders lowers the average temperature of the exhaust gas flowing into the catalyst device 24. Thus, when the unburned fuel remaining in the catalyst device 24 is burned out, the catalyst temperature TC will be lowered. When the catalyst temperature TC drops below the specified heating start temperature T0 (S108: YES), the electronic control unit 30 executes the process of steps S101 to S107 again. The heating start temperature T0 is set to a temperature lower than the regenerable temperature T1.

On the other hand, when the PM accumulated amount DPM has dropped below a specified regeneration completion determination value D0 as a result of the process of the steps S101 to S107 (S109: YES), the electronic control unit 30 stops the partial-cylinder operation and the power compensation control in steps SS110 and S111, thereby completing the current filter regeneration control. The regeneration completion determination value D0 is set to be less than the clogging determination value D1.

<Ignition Timing Control>

During the operation of the multi-cylinder internal combustion engine 11, the electronic control unit 30 controls the timing of ignition of air-fuel mixture by the ignition devices 26 in the respective cylinders 20. That is, the electronic control unit 30 performs ignition timing control. In the present embodiment, the electronic control unit 30 controlling the ignition timing of the multi-cylinder internal combustion engine 11 corresponds to the ignition timing controller. The ignition timing control performed by the ignition timing controller according to the present embodiment will now be described.

Figure 3:
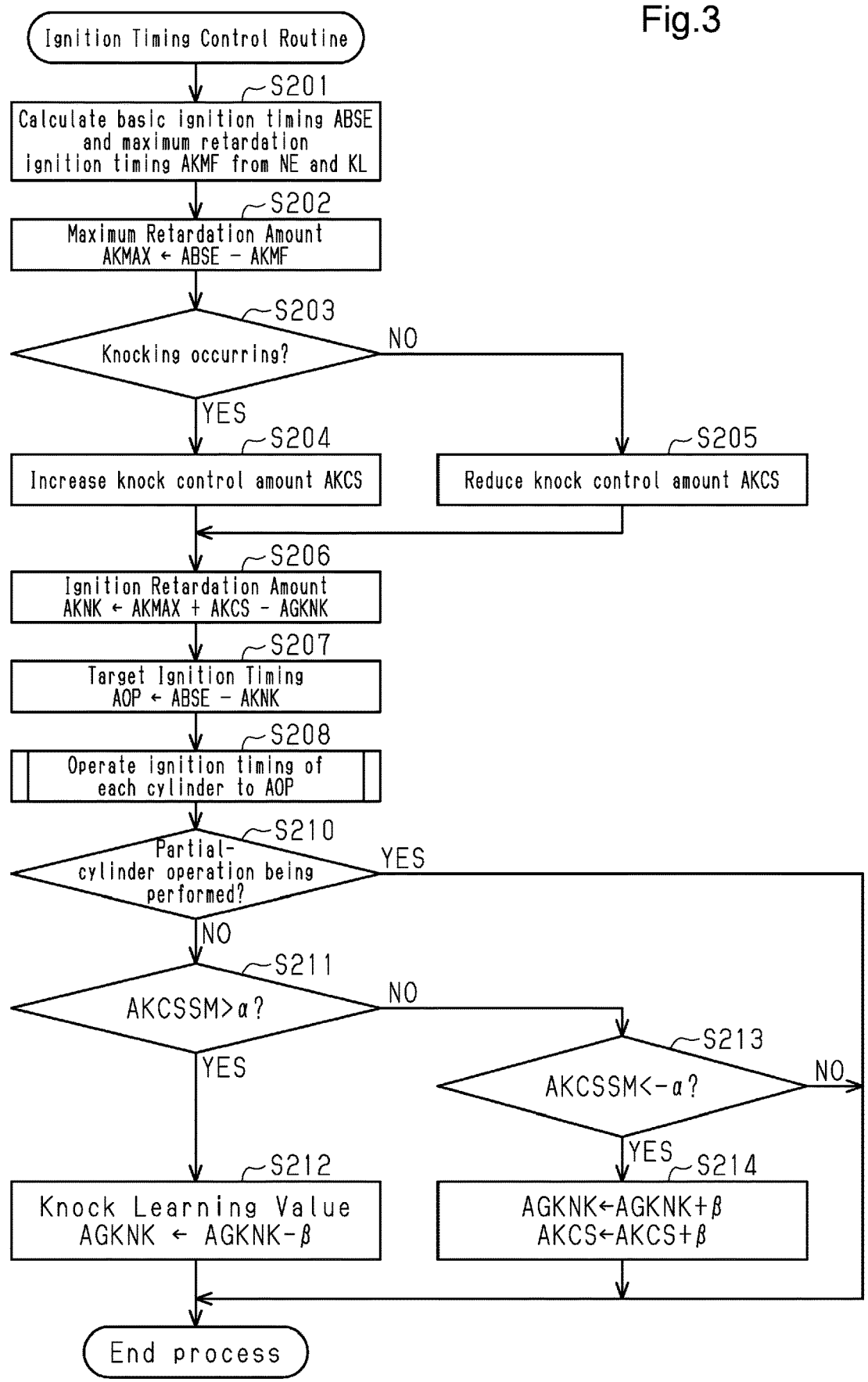
FIG. 3 is a flowchart of an ignition timing control routine performed by the ignition timing controller shown in FIG. 1.

FIG. 3 is a flowchart of an ignition timing control routine executed by the electronic control unit 30. During the operation of the multi-cylinder internal combustion engine 11, the electronic control unit 30 repeatedly executes this routine at a specified control cycle. The ignition timing is expressed by a crank angle on the advancing side with respect to the compression top dead center. That is, the value representing the ignition timing increases as the advanced amount of the ignition timing from the compression top dead center increases.

When this routine is started, a basic ignition timing ABSE and a maximum retardation ignition timing AKMF are calculated based on the engine rotation speed NE and an engine load factor KL in step S201. The engine load factor KL represents the filling factor of intake air in the cylinders 20, and the value of the engine load factor KL is obtained from the detected result of the intake air amount GA and the like. The basic ignition timing ABSE is the more retarded one of an optimum ignition timing and a knock limit ignition timing. The optimum ignition timing is the ignition timing at which the efficiency of torque generation of the multi-cylinder internal combustion engine 11 is maximized. The knock limit ignition timing is the most retarded ignition timing within the range of the ignition timing in which the occurrence of knocking has been observed. The maximum retardation ignition timing AKMF is the most advanced ignition timing within the range of the ignition timing in which it has been confirmed that knocking does not occur even under conditions in which knocking is likely to occur. In order to improve the fuel consumption rate, it is advantageous to set a target ignition timing AOP, which is the final setting of the ignition timing, to ignition timing that is as close to the basic ignition timing ABSE as possible. Setting the target ignition timing AOP to an ignition timing that is more retarded than the maximum retardation ignition timing AKMF would have no effect in reducing knocking. Accordingly, in the ignition timing control, the target ignition timing AOP is adjusted within the range from maximum retardation ignition timing AKMF to the basic ignition timing ABSE.

In the subsequent step S202, a maximum retardation amount AKMAX is set to a value obtained by subtracting the maximum retardation ignition timing AKMF from the basic ignition timing ABSE. The maximum retardation amount AKMAX is the upper limit of the retardation amount of the target ignition timing AOP in relation to the basic ignition timing ABSE in the ignition timing control.

In the subsequent step S203, a knock determination is performed based on the output signal of the knock sensor 35 to determine whether knocking is occurring. If it is determined that knocking is occurring in the knock determination (S203: YES), the process is advanced to step S204. Then, after a knock control amount AKCS is increased in step S204, the process is advanced to step S206. If it is determined that knocking is not occurring in the knock determination (S203: NO), the process is advanced to step S205. Then, after the knock control amount AKCS is reduced in step S205, the process is advanced to step S206.

The knock control amount AKCS is an operated amount of the ignition timing expressed by a crank angle. The greater the value of the knock control amount AKCS, the greater the operated amount for retarding the ignition timing becomes. Thus, the operated amount for advancing the ignition timing increases when the knock control amount AKCS is reduced, and decreases when the knock control amount AKCS is increased. At the start of the multi-cylinder internal combustion engine 11, the knock control amount AKCS is set to 0, which is an initial value. The amount of increase of the knock control amount AKCS in step S204 is set in correspondence with the intensity and the occurrence frequency of the detected knocking. Specifically, the knock control amount AKCS is increased by a greater degree as the intensity of the knocking increases or as the occurrence frequency of the knocking increases. In contrast, the amount of decrease of the knock control amount AKCS in step S205 is a constant. Specifically, the amount of decrease is set to a positive value that is less than the minimum value of the amount of increase of the knock control amount AKCS in step S205.

When the process is advanced to step S206 after step S204 or S205, in which the knock control amount AKCS is increased or decreased, an ignition retardation amount AKNK is calculated in S206. The ignition retardation amount AKNK is calculated by adding the knock control amount AKCS to the maximum retardation amount AKMAX and subtracting a knock learning value AGKNK from the addition result. (AKNK←AKMAX+AKCS−AGKNK). The ignition retardation amount AKNK represents the operated amount for retarding the ignition timing from the basic ignition timing ABSE. The knock learning value AGKNK, which is used to calculate the ignition retardation amount AKNK is an operated amount of the ignition timing expressed by a crank angle. A greater value of the knock learning value AGKNK indicates a greater value of the operated amount for advancing the ignition timing. The knock learning value AGKNK is stored in the memory 32 even when the electronic control unit 30 is not operating, and continues to be used when the electronic control unit 30 is activated for the next time. At the time of shipment of the hybrid vehicle 10, the knock learning value AGKNK is 0, which is the initial value.

Thereafter, in step S207, the value of the target ignition timing AOP is set to time that is retarded from the basic ignition timing ABSE by the ignition retardation amount AKNK (AOP←ABSE−AKNK). In the subsequent step S208, the electronic control unit 30 operates the ignition devices 26 of the cylinders 20 such that ignition is performed at the target ignition timing AOP set in step S207, then advances the process to step S210.

In the process after step 210 in the ignition timing control routine, a learning process is executed to update the value of the above-described knock learning value AGKNK. In step S210, it is determined whether the partial-cylinder operation is being performed. If the partial-cylinder operation is being performed (S210: YES), the process of this routine in the current control cycle is ended. That is, the knock learning value AGKNK is not updated in the current control cycle in this case, and the value from the previous control cycle is maintained.

If the partial-cylinder operation is not being performed (S210: NO), that is, if the all-cylinder operation is being performed, the process is advanced to step S211. In step S211, it is determined whether a gradual change value AKCSSM of the knock control amount AKCS is greater than a specified positive value $\alpha$. The gradual change value AKCSSM is obtained through a process that reduces the increasing/decreasing rate of the knock control amount AKCS. In the present embodiment, a moving average of the knock control amount AKCS is used as the gradual change value AKCSSM.

If it is determined that the gradual change value AKCSSM is greater than a in step S211 (YES), the process is advanced to step S212. In step S212, the electronic control unit 30 reduces the knock learning value AGKNK by a specified update amount $\beta$, and also reduces the knock control amount AKCS by the update amount $\beta$. Thereafter, the electronic control unit 30 ends the process of this routine in the current control cycle.

If it is determined that the gradual change value AKCSSM is less than or equal to a in step S211 (NO), the process is advanced to step S213. In step S213, it is determined whether the gradual change value AKCSSM is less than $-\alpha$. If the gradual change value AKCSSM is less than $-\alpha$ (YES), the process is advanced to step S214. In step S214, the electronic control unit 30 increases the knock learning value AGKNK by the update amount $\beta$, and also increases the knock control amount AKCS by the update amount $\beta$. Thereafter, the electronic control unit 30 ends the process of this routine in the current control cycle.

If it is determined that the gradual change value AKCSSM is greater than or equal to $-\alpha$ in step S213 (NO), that is, if the gradual change value AKCSSM is in the range between $-\alpha$ and $\alpha$, inclusive, the process of this routine is ended. The knock learning value AGKNK is not updated in the current control cycle in this case, and the value from the previous control cycle is maintained.

In the present embodiment, the process of step S203 in the ignition timing control corresponds to the knock determination process that determines whether knocking is occurring based on the output signal of the knock sensor 35. The process of steps S203 to S205 corresponds to the feedback correction process. When it is determined that knocking is occurring in the knock determination, the feedback correction process updates the knock control amount AKCS so as to reduce the operated amount for advancing the ignition timing. Also, when it is determined that knocking is not occurring in the knock determination, the feedback correction process updates the knock control amount AKCS so as to increase the operated amount for advancing the ignition timing. Further, the process of steps S206 to S208 corresponds to the operation process that operates the ignition timing of each cylinder based on the knock control amount AKCS and the knock learning value AGKNK. The process of steps S210 to S214 corresponds to the learning process that updates the knock learning value AGKNK such that the knock learning value AGKNK gradually approaches the knock control operated amount.

<Operations and Advantages of First Embodiment>

In the present embodiment, the electronic control unit 30 performs the knock determination to determine whether knocking is occurring based on the output signal of the knock sensor 35, which detects vibration of the cylinder block of the multi-cylinder internal combustion engine 11. On the basis of the result of the knock determination, the electronic control unit 30 updates the knock control amount AKCS and the knock learning value AGKNK, thereby performing the knock control of the ignition timing to advance the target ignition timing AOP within the range in which knocking is suppressed.

In the following description, the operated amount for advancing the ignition timing based on the knock control amount AKCS and the knock learning value AGKNK in the knock control will be referred to as a knock control operated amount. As described above, the knock control amount AKCS has a positive value when the ignition timing is retarded, and has a negative value when the ignition timing is advanced. In contrast, the knock learning value AGKNK has a positive value when the ignition timing is advanced, and has a negative value when the ignition timing is retarded. Thus, in the present embodiment, the knock control operated amount is a difference (AGKNK−AKCS), which is obtained by subtracting the knock control amount AKCS from the knock learning value AGKNK.

When the knock determination determines that knocking is not occurring, the knock control amount AKCS is reduced. That is, the knock control amount AKCS is updated such that the operated amount for advancing the ignition timing is increased. Also, when the knock determination determines that knocking is occurring, the knock control amount AKCS is increased. That is, the knock control amount AKCS is updated such that the operated amount for advancing the ignition timing is reduced. Then, the knock control amount AKCS is updated based on the result of the knock determination, so that a feedback correction of the ignition timing is performed to advance the ignition timing within the range in which knocking is suppressed.

If the absolute value of the gradual change value AKCSSM of the knock control amount AKCS exceeds a when the partial-cylinder operation is not being performed, that is, when the all-cylinder operation is being performed, the knock learning value AGKNK is updated to reduce the absolute value of the knock control amount AKCS, while maintaining the value of the knock control operated amount. That is, during the all-cylinder operation, the knock learning value AGKNK is updated to gradually approach the knock control operated amount. Accordingly, in a condition in which the basic ignition timing ABSE is the advancement limit of the ignition timing, a value of the knock control operated amount when the ignition timing is maximally advanced within the range in which knocking is suppressed is learned as the knock learning value AGKNK.

In the hybrid vehicle 10, which is equipped with the ignition timing controller according to the present embodiment, the electronic control unit 30 performs the filter regeneration control when the PM accumulated amount DPM of the catalyst device 24 exceeds the clogging determination value D1. In the filter regeneration control, the electronic control unit 30 burns and removes accumulated fine particulate matter in the catalyst device 24, thereby recovering the fine particulate matter trapping ability of the catalyst device 24. In accordance with a temperature increase request for the catalyst device 24 in the filter regeneration control, the electronic control unit 30 of the hybrid vehicle 10 performs the partial-cylinder operation, in which the electronic control unit 30 suspends combustion in some of the cylinders 20, while performing combustion in the remaining cylinders 20.

The cylinder 20 in which combustion is suspended during the partial-cylinder operation generates vibration that is different from the vibration generated during combustion. The knock sensor 35 detects the vibration of the combustion-suspended cylinder, so that an erroneous knock determination may be made even if knocking is not actually occurring. Also, the electronic control unit 30 of the hybrid vehicle 10 performs the power compensation control during the partial-cylinder operation. The power compensation control compensates for the reduction in the driving force due to the deactivated cylinder using the output of the generator motors MG1, MG2. In the power compensation control, the output torque of the generator motors MG1, MG2 is repeatedly increased and reduced, which generates vibration. The generated vibration is transmitted to the multi-cylinder internal combustion engine 11. Such vibration caused by the power compensation control may be detected by the knock sensor 35 and may cause an erroneous knock determination. If the knock control amount AKCS is updated based on such an erroneous knock determination, the knock control operated amount may have an inappropriate value.

In this regard, the electronic control unit 30 of the present embodiment stops updating the knock learning value AGKNK during the partial-cylinder operation. Accordingly, the knock learning value AGKNK ceases to reflect the result of the knock control based on an erroneous knock determination during the partial-cylinder operation and the power compensation control. That is, the knock learning value AGKNK no longer reflects an inappropriate value of the knock control operated amount. The value of the knock control amount AKCS based on the knock determination continues to be updated even during the partial-cylinder operation. As described above, during the partial-cylinder operation, an erroneous knock determination may be made even if knocking is not actually occurring. Such an erroneous knock determination causes the operated amount for advancing the ignition timing by the knock control to be less than a proper amount. Accordingly, the occurrence of knocking will be suppressed by continuing to update the knock control amount AKCS based on the knock determination during the partial-cylinder operation.

The present embodiment has the following advantages.

(1) The electronic control unit 30 of the present embodiment stops updating the knock learning value AGKNK during the partial-cylinder operation. Accordingly, the knock learning value AGKNK ceases to reflect the result of an erroneous knock determination during the partial-cylinder operation. This prevents the learning accuracy of the knock learning value AGKNK from being reduced in the multi-cylinder internal combustion engine 11, which performs the partial-cylinder operation.

(2) The electronic control unit 30 continues updating the knock control amount AKCS based on the result of the knock determination even during the partial-cylinder operation. This suppresses the occurrence of knocking during the partial-cylinder operation.

Second Embodiment

Next, an ignition timing controller for a multi-cylinder internal combustion engine according to a second embodiment will now be described with reference to FIG. 4. In the present embodiment, the same reference numerals are given to those components that the same as the corresponding components of the first embodiment and detailed description thereof is omitted. The configuration of the ignition timing controller of the present embodiment is the same as that of the first embodiment except for the contents of the learning process in the ignition timing control routine.

Figure 4:
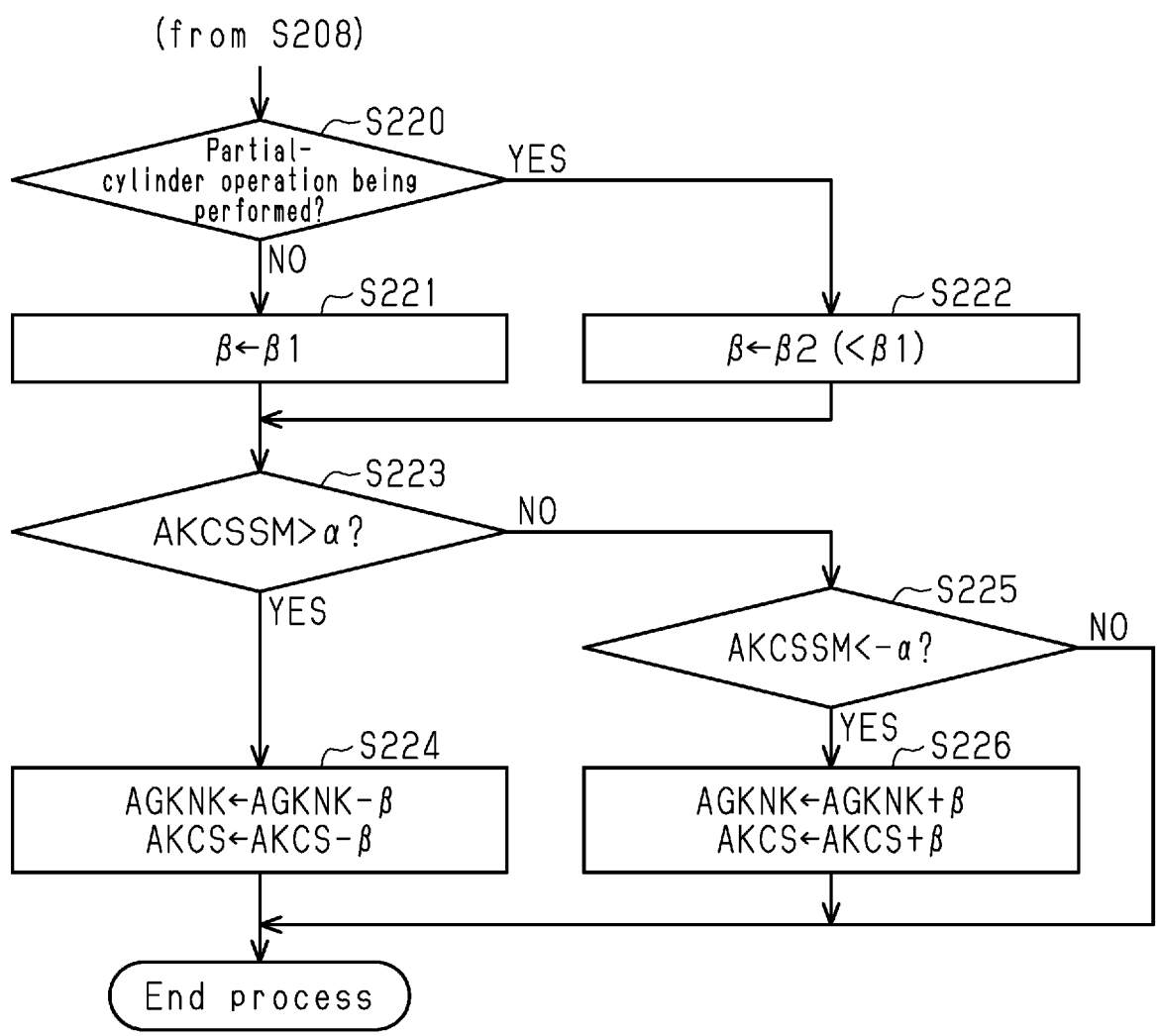
FIG. 4 is a flowchart partially showing an ignition timing control routine performed by an ignition timing controller for a multi-cylinder internal combustion engine according to a second embodiment.

FIG. 4 is a flowchart showing a part corresponding to the learning process in the ignition timing control routine performed by an electronic control unit 30 in an ignition timing controller according to the present embodiment. The process of steps S220 to S226 of FIG. 4 is executed in place of the process of steps S210 to S214 in the ignition timing control routine of the first embodiment shown in FIG. 3. That is, in the present embodiment, the process is advanced to step S220 of FIG. 4 after the process of step S208 in FIG. 3.

When the process is advanced to step S220, it is determined in step S220 whether the partial-cylinder operation is being performed. If the partial-cylinder operation is not being performed (S220: NO), that is, if the all-cylinder operation is being performed, the process is advanced to step S221. In step S221, the update amount β is set to a specified positive value β1. The process is then advanced to step S223. In contrast, if the partial-cylinder operation is being performed (S220: YES), the process is advanced to step S222. In step S222, the update amount β is set to a specified positive value β2, which is less than the value β1. The process is then advanced to step S223.

When the process is advanced to step S223, it is determined in step S223 whether the gradual change value AKCSSM of the knock control amount AKCS is greater than α. If the gradual change value AKCSSM is determined to be greater than α (YES), the process is advanced to step S224. In step S224, the electronic control unit 30 reduces the knock learning value AGKNK by the update amount β, and also reduces the knock control amount AKCS by the update amount β. Thereafter, the electronic control unit 30 ends the process of this routine in the current control cycle.

If it is determined that the gradual change value AKCSSM is less than or equal to α in step S223 (NO), the process is advanced to step S225. In step S225, it is determined whether the gradual change value AKCSSM is less than −α. If the gradual change value AKCSSM is less than −α (YES), the process is advanced to step S226. In step S226, the electronic control unit 30 increases the knock learning value AGKNK by the update amount β, and also increases the knock control amount AKCS by the update amount β. Thereafter, the electronic control unit 30 ends the process of this routine in the current control cycle.

If it is determined that the gradual change value AKCSSM is greater than or equal to −α in step S225 (NO), that is, if the gradual change value AKCSSM is in the range between −α and α, inclusive, the process of this routine is ended. The knock learning value AGKNK is not updated in the current control cycle in this case, and the value from the previous control cycle is maintained.

In the present embodiment, the knock learning value AGKNK continues being updated even during the partial-cylinder operation. However, during the partial-cylinder operation, the update amount β of the knock learning value AGKNK for each control cycle is set to the value β2, which is less than the value β1 used during the all-cylinder operation. Thus, during the partial-cylinder operation, the speed of update of the knock learning value AGKNK toward the knock control operated amount in the learning process is less than that during the all-cylinder operation. That is, during the partial-cylinder operation, update of the knock learning value AGKNK is limited such that the followability of the knock learning value AGKNK to the knock control operated amount is lower than during the all-cylinder operation. Even in such a case, the result of the knock control based on an erroneous knock determination during the partial-cylinder operation is unlikely to be reflected on the knock learning value AGKNK. Thus, the present embodiment also prevents the learning accuracy of the knock learning value from being reduced in the multi-cylinder internal combustion engine 11, which performs the partial-cylinder operation.

As described above, the present embodiment varies the value of the update amount β between the partial-cylinder operation and the all-cylinder operation, thereby reducing the followability of the knock learning value AGKNK to the knock control operated amount during the partial-cylinder operation as compared to that during the all-cylinder operation. In place of or in addition to the above-described change of the update amount β, the value of a used in steps S223 and S225 may be varied between the partial-cylinder operation and the all-cylinder operation. That is, during the partial-cylinder operation, α is set to a positive value greater than that in the all-cylinder operation. Such a change in the value of a also causes the followability of the knock learning value AGKNK to the knock control operated amount to be lower in the partial-cylinder operation than in the all-cylinder operation. Thus, the result of the knock control based on an erroneous knock determination during the partial-cylinder operation is unlikely to be reflected on the knock learning value AGKNK.

Other Embodiments

The above-described embodiments may be modified as follows. The above-described embodiments and the following modifications can be combined as long as the combined modifications remain technically consistent with each other.

The electronic control unit 30 is not limited to a device that includes the arithmetic processing circuit 31 and the memory 32. For example, the electronic control unit 30 may include a dedicated hardware circuit (for example, an application-specific integrated circuit (ASIC)) that executes at least part of the processes executed in the above-described embodiments through hardware processing. That is, the electronic control unit 30 may be processing circuitry that includes any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

The operational zone of the multi-cylinder internal combustion engine 11 may be divided into several learning zones according to the engine rotation speed NE, and the knock learning value AGKNK may be set for each learning zone. In this case, the learning process of the knock learning value AGKNK is executed separately for each learning zone.

In the above-described embodiments, the electronic control unit 30 performs the knock control in a uniform manner for all the cylinders 20 of the multi-cylinder internal combustion engine 11. The electronic control unit 30 may perform the knock control separately for each of the cylinders 20 of the multi-cylinder internal combustion engine 11. That is, the electronic control unit 30 may perform the knock determination process, the feedback correction process, and the learning process separately for each cylinder 20. In this case, the knock control amount AKCS and the knock learning value AGKNK are set and updated separately for each cylinder 20. In a case in which the knock control is performed separately for each cylinder, the electronic control unit 30 continues the knock determination process, the feedback correction process, and the learning process for the combustion cylinders, and suspends the knock determination process, the feedback correction process, and the learning process for the deactivated cylinders during the partial-cylinder operation. Even in this case, during the partial-cylinder operation, the vibration generated in the deactivated cylinders may cause an erroneous knock determination in the knock determination process in the combustion cylinder, and the knock control operated amount of that cylinder has an inappropriate value. Therefore, even in a case in which the knock control is performed separately for each cylinder, the update of the knock learning value AGKNK during the partial-cylinder operation is preferably limited in order to prevent the learning accuracy of the knock learning value AGKNK for each cylinder from being reduced.

In the hybrid vehicle 10, to which the above-described embodiments are applied, the electronic control unit 30 performs the power compensation control at the same time as the partial-cylinder operation. Even if the power compensation control is not performed, vibration that is different from that in the all-cylinder operation is generated in the deactivated cylinder during the partial-cylinder operation, and the generated vibration may cause an erroneous knock determination. Thus, even in a case in which the electronic control unit 30 performs the partial-cylinder operation without performing the power compensation control, the ignition timing control of the above-described embodiments prevents the learning accuracy of the knock learning value AGKNK from being reduced.

In a vehicle that is not provided with the generator motors MG1, MG2 but includes only the multi-cylinder internal combustion engine 11 as a drive source, the electronic control unit 30 cannot perform the power compensation control, but can execute the filter regeneration process through the partial-cylinder operation. Therefore, if the partial-cylinder operation is performed in the multi-cylinder internal combustion engine mounted on such a vehicle, the ignition timing control of the above-described embodiments would prevent the learning accuracy of the knock learning value AGKNK from being reduced.

The partial-cylinder operation is performed in response not only to the temperature increase request in the filter regeneration process, but also to the temperature increase request for the catalyst device 24 to promote the catalyst activation during a cold start of the multi-cylinder internal combustion engine 11. Further, in some cases, the partial-cylinder operation is performed in order to reduce the pumping loss in a low load region of the multi-cylinder internal combustion engine 11. In either case, vibration that is different from that in the all-cylinder operation is generated in the deactivated cylinder during the partial-cylinder operation, and an erroneous knock determination may be caused. Thus, if the ignition timing control of the above-described embodiments is performed in a multi-cylinder internal combustion engine that performs the partial-cylinder operation, the value of the knock learning value AGKNK is unlikely to reflect the result of the knock control based on an erroneous knock determination during the partial-cylinder operation. Therefore, whatever the objective of the partial-cylinder operation is, the ignition timing control of the above-described embodiments prevents the learning accuracy of the knock learning value AGKNK from being reduced in any multi-cylinder internal combustion engine that performs the partial-cylinder operation.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An ignition timing controller for a multi-cylinder internal combustion engine, wherein
the multi-cylinder internal combustion engine is configured to perform:
an all-cylinder operation that performs combustion in all cylinders; and
a partial-cylinder operation that suspends combustion in part of the cylinders while performing combustion in the remaining cylinders, the ignition timing controller comprising processing circuitry, the processing circuitry being configured to execute:
a process that sets a knock control amount and a knock learning value as operated amounts of ignition timing for advancing the ignition timing within a range in which knocking is suppressed;
a knock determination process that determines whether knocking is occurring based on an output signal of a knock sensor;
a feedback correction process that
updates the knock control amount so as to reduce the operated amounts for advancing the ignition timing when it is determined that knocking is occurring, and
updates the knock control amount so as to increase the operated amounts for advancing the ignition timing when it is determined that knocking is not occurring;
a learning process that updates the knock learning value such that the knock learning value gradually approaches a knock control operated amount, the knock control operated amount being an operated amount for advancing the ignition timing based on the knock control amount and the knock learning value;
an operation process that operates ignition timing of each cylinder based on the knock control amount and the knock learning value; and
a process that limits update of the knock learning value such that a followability of the knock learning value to the knock control operated amount is lower during the partial-cylinder operation than during the all-cylinder operation.

2. The ignition timing controller for the multi-cylinder internal combustion engine according to claim 1, wherein the processing circuitry is configured to stop updating the knock learning value during the partial-cylinder operation.

3. The ignition timing controller for the multi-cylinder internal combustion engine according to claim 1, wherein
the update of the knock learning value includes changing the knock learning value by a constant amount at each specified control cycle, and
the processing circuitry is configured to set the constant amount to be smaller during the partial-cylinder operation than during the all-cylinder operation.

4. The ignition timing controller for the multi-cylinder internal combustion engine according to claim 1, wherein the partial-cylinder operation is performed in response to a temperature increase request for a catalyst device for purifying exhaust gas provided in an exhaust system of the multi-cylinder internal combustion engine.

5. The ignition timing controller for the multi-cylinder internal combustion engine according to claim 1, wherein
the multi-cylinder internal combustion engine is mounted on a hybrid vehicle that is equipped with an electric motor as a drive source, in addition to the multi-cylinder internal combustion engine, and
in response to a temperature increase request for a catalyst device for purifying exhaust gas provided in an exhaust system of the multi-cylinder internal combustion engine, the hybrid vehicle performs
the partial-cylinder operation of the multi-cylinder internal combustion engine, and
a power compensation control that compensates for a reduction in driving force due to the suspended combustion in the part of the cylinders using an output of the electric motor during the partial-cylinder operation.

6. An ignition timing control method for a multi-cylinder internal combustion engine, wherein
the multi-cylinder internal combustion engine is configured to perform:
an all-cylinder operation that performs combustion in all cylinders; and
a partial-cylinder operation that suspends combustion in part of the cylinders while performing combustion in the remaining cylinders,
the ignition timing control method comprises:
setting a knock control amount and a knock learning value as operated amounts of ignition timing for advancing the ignition timing within a range in which knocking is suppressed;
determining whether knocking is occurring based on an output signal of a knock sensor;
updating the knock control amount so as to reduce the operated amounts for advancing the ignition timing when it is determined that knocking is occurring;
updating the knock control amount so as to increase the operated amounts for advancing the ignition timing when it is determined that knocking is not occurring;
updating the knock learning value such that the knock learning value gradually approaches a knock control operated amount, the knock control operated amount being an operated amount for advancing the ignition timing based on the knock control amount and the knock learning value;
operating ignition timing of each cylinder based on the knock control amount and the knock learning value; and
limiting update of the knock learning value such that a followability of the knock learning value to the knock control operated amount is lower during the partial-cylinder operation than during the all-cylinder operation.

* * * * *